Feb. 25, 1969 A. J. NELSON 3,429,588

JOINT CONSTRUCTION

Original Filed Nov. 18, 1964

INVENTOR.
ARTHUR J. NELSON
BY
ATTORNEYS

United States Patent Office 3,429,588
Patented Feb. 25, 1969

3,429,588
JOINT CONSTRUCTION
Arthur J. Nelson, Santa Barbara, Calif.
(1998 Broadway, San Francisco, Calif. 94109)
Original application Nov. 18, 1964, Ser. No. 412,003, now Patent No. 3,286,286, dated Nov. 22, 1966. Divided and this application May 26, 1966, Ser. No. 553,199
U.S. Cl. 285—11     1 Claim
Int. Cl. F16l 17/00

ABSTRACT OF THE DISCLOSURE

A coupling for flexibly joining a pair of pipeline sections together in end to end fluid communication. The coupling comprises a ball element adapted to be secured to one of the sections and a segmented socket element adapted to be secured to the other of the sections. The socket element is made up of two radially flanged components matingly received on the ball element to either side thereof for articulation relative thereto. The flanged components are releasably held together in juxtaposition relative to each other by a strap extending therearound and having internal snap rings engaged therewith. The snap rings are releasably retained within the strap to provide for the selective assembly and disassembly of the coupling. Fluid ducts are provided in the strap and socket components to provide for the supply of flushing and lubricating fluid to the external surfaces of the ball element.

---

Figure 1:
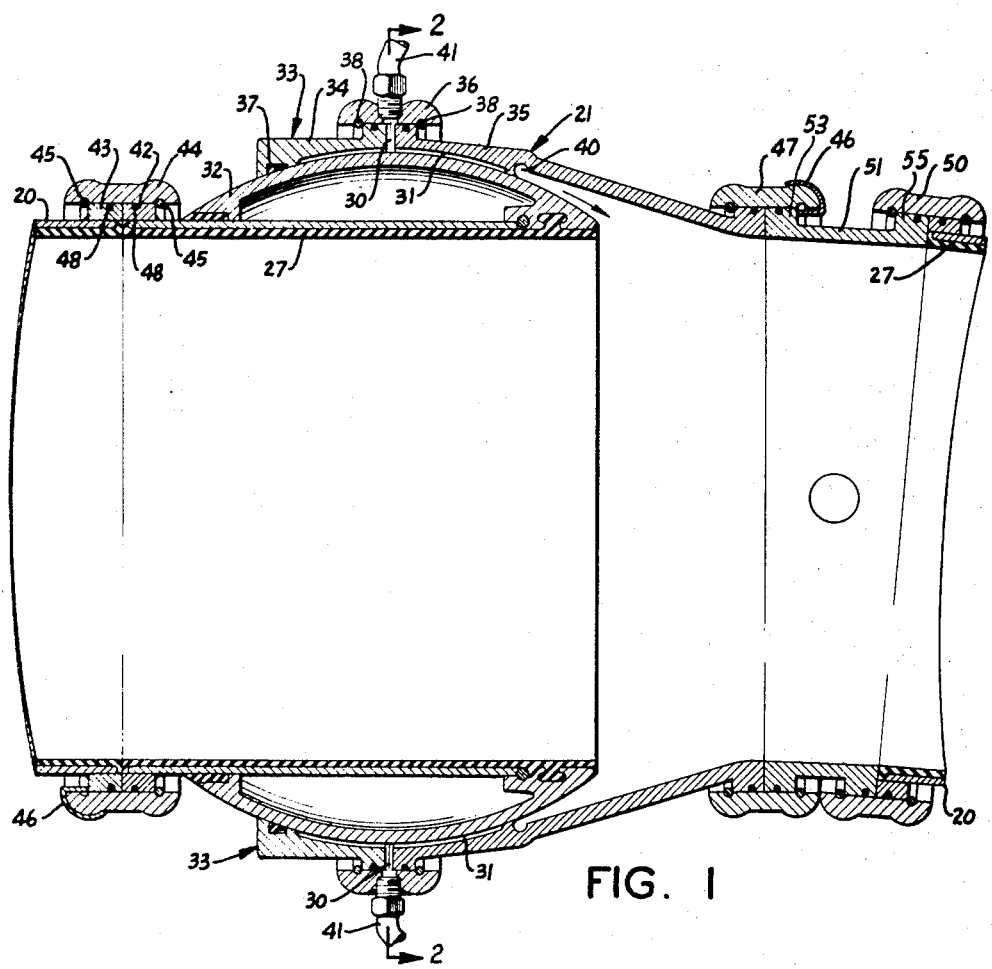

This application is a division of my co-pending application Ser. No. 412,003, filed Nov. 18, 1964, and entitled, "Pontoon Support for Over-the-Water Pipelines," and now Patent No. 3,286,286.

The present invention relates to an improved joint construction for effecting secure connection between elements and, more particularly, is directed to such a construction adapted to be readily assembled and disassembled. The invention is especially concerned with a ball joint construction ideally suited for articulatively joining pipeline sections intended for the conveying of abrasive fluids.

In the prior art, joint constructions to effect the joining of heavy pipeline sections have typically taken the form of large, bolted-together mating flanges. This construction has been resorted to to assure a sealed and rugged connection. It results, however, in a joint of very large mass which requires considerable time for both assembly and disassembly.

In the prior art, ball joint constructions are also widely employed to effect the articulative joining of rigid pipeline sections. These constructions typically comprise a ball element secured to one of the sections and a socket element secured to the other of the sections. The socket element is generally comprised of a pair of mating sections joined together by bolted flange connections and, thus, suffers from the aforementioned disadvantages typically accompanying joint constructions. When it has been desired to employ prior art ball joint constructions for the conveyance of abrasive fluids, typical practice has been simply to construct the joint of heavier, higher hardness components. The use of such components further adds to the mass and expense of the joint.

It is, accordingly, a principal object of the present invention to provide a joint, and particularly a ball joint, construction which avoids disadvantages of the aforementioned type typically encumbent with prior art constructions.

A more specific object of the invention is to provide a joint construction of relatively low mass which is facilitated for ready assembly and disassembly.

Another object of the invention is to provide an articulative ball joint construction designed to effect the contiuous flushing of the mating components thereof which are movable relative to each other. With respect to this object, it is another object to provide such a construction wherein flushing is effected through a fluid contained to provide for cushioning and lubricating of the mating components.

A further object of the present invention is to provide a construction to impart a predetermined degree of curvature to a rigid element which is to be secured to a ball joint. With respect to this object, it is a related object to provide such a construction facilitated for ready assembly and disassembly.

In summary, the present invention may be defined as a ball and socket coupling for use in connecting fluid conduits designed for the conveyance of highly abrasive fluid. As the abstract indicates, the coupling is comprised of a ball element, a segmented socket element matingly received on the ball element for articulation relative thereto, and a strap releasably securing the segments of the socket element together. The socket and strap elements are provided with fluid passage means to continuously supply fluid to the surface of the ball element for flushing and/or lubricating purposes. Seal and wiping means on the socket element cooperate with the passage means to direct fluid supplied thereto interiorly of the pipe sections joined by the coupling after the passage of the fluid over the ball element.

Figure 2:
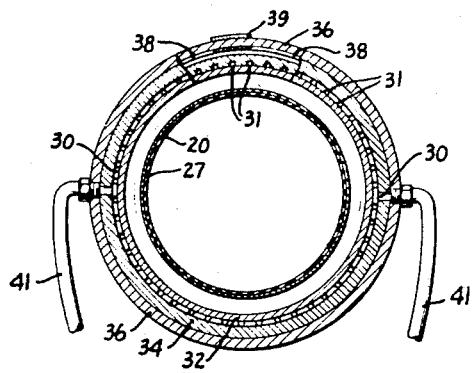

The specific construction of the present invention and the foregoing and other objects will become more apparent when viewed in light of the following description and accompanying drawings wherein:

FIG. 1 is a sectional view, in elevation, illustrating a pair of pipeline sections joined through means of the inventive coupling constructions; and, FIG. 2 is a sectional view, taken on the plane designated by line 2—2 in FIG. 1.

It is here noted that the coupling construction of the present invention is ideally suited for use in a support system of the type disclosed in my aforementioned application Serial No. 412,003. Specifically, the construction is well adapted for coupling conduits to be used in the conveyance of abrasive fluids where conduit flexibility and ready assembly and disassembly is required. It is to be understood, however, that the coupling construction of the present invention is not limited to use in the environment shown in my co-pending application.

Referring now specifically to the drawings, the inventive coupling construction is illustrated therein as being applied between a pair of rigid pipeline sections 20. In the drawings, the numeral 21 is used to designate the ball joint construction of the invention in its entirety. The specific construction of the ball joint and the rigid coupling connections cooperating therewith will become more apparent from the following detailed description.

The preferred construction illustrated in the drawings is designed for use in conveying abrasive fluids, such as those produced during hydraulic dredging operations. Where less abrasive fluids, such as crude petroleum, are conveyed through the pipeline, the abrasion preventing structure may be omitted to the desired degree. This structure comprises, in part, a rubber sheath 27 lining the sections 20 and a fluid flushing duct and grooves 30 and 31, respectively, at the joint 21. The remaining abrasion preventing structure will be developed subsequently.

The joint 21 is comprised of a ball section 32 and a socket element 33 slidably and sealingly received on the section 32. The socket element 33 is of high brinnel hardness to withstand abrasion and comprises an annular section 34 and a semi-spherical section 35 which are held together by a rigid annular strap 36 extending around juxtaposed collars thereon. Snap rings 38 having U-shaped clips 39 received between the spaced ends thereof are received in the strap 36 to hold the collars on the sections 34 and 35 in juxtaposed relationship. The details of the snap rings, clips, and seals cooperating with the sections 34 and 35 will become more apparent subsequently. The ducts 30 and grooves 31 are formed in the socket element 33 and are so arranged as to continuously supply flushing fluid to the mating surfaces of the ball section and socket element. Specifically, the grooves 31 open through the surface of the element 33 in juxtaposition to the section 32 and are provided with sealing and wiping elements 37 and 40 at their opposed ends. The sealing element 37 restrains the escape of fluid therepast from the grooves 31, while the wiping element 40 permits the limited flow of flushing fluid therepast and into the interior of the joint. The flow of fluid past the wiping element 40 is so limited that the fluid within the grooves 31 is maintained under pressure and, in effect, establishes a fluid cushion between the socket element 33 and ball section 32. At this point it is noted that the grooves 31 are separated from each other and extend longitudinally of the socket element 33. The duct 30 extends completely around the element 33 and communicates with each of said grooves. Flushing fluid is provided to the duct 30 through means of flexible hoses 41 secured thereto and extending into fluid communication with a source of flushing fluid (not illustrated), such as water, under pressure.

Mating annular collars 42 and 43 on the ball section 32 and the pipeline section 21 adjacent thereto cooperate with an annular strap 44 extending therearound to hold said pipeline and ball section in locked engagement. This locked engagement is accomplished through means of annular snap rings 45, corresponding to the rings 38, held in the strap 44 in juxtaposition to the outside surfaces of the collars 42 and 43. In order to assure that snap rings 45 will not inadvertently compress and release the sections 20 and 32, a U-shaped clip 46, corresponding to the clip 39, is snapped over the strap 44 and one leg thereof between the opposed ends of the snap ring. Naturally, the clip 46 is put in place after the snap rings 45 are engaged in the strap 44. O-rings 48 extend around the flanges 42 and 43 in juxtaposition to the strap 44 to establish a sealed connection between the flanges and the strap.

At this point it is noted that the strap 36 and the retention and sealing structure therein cooperates with the annular sections 34 and 35 in a manner corresponding to that described with reference to the relationship between the strap 44 and the sections 20 and 32. Furthermore, the socket element 33 is secured to the pipeline section 20 adjacent thereto through means of annular straps 47 and 50 corresponding in construction and operation with the strap 44. In the latter case, the straps 47 and 50 hold a wedge-shaped conduit section 51 between the element 33 and pipeline section 20. The section 51 is shown to illustrate how a preset curvature may be imparted to the pipeline formed of the sections 20 without bending of the ball joint. Imparting a pre-set curvature in this manner, rather than through bending of the ball joint, has the advantage that flow restriction resulting from bending of the ball joint is avoided. The section 51 comprises a segment having a pair of opposed substantially planar end surfaces disposed at an angle relative to each other. Collars 53 and 55, corresponding substantially to the collars 42 and 43, are fixed to and extend outwardly from the end surfaces of the segment and provide for securing of the segment through means of the straps 47 and 50.

To conclude, from the foregoing description it is believed apparent that the present invention enables the accomplishment of the objects initially set forth herein.

What is claimed is:
1. A ball joint for securing a pair of pipeline sections together in end to end relationship, comprising:
 (A) a ball element having one side adapted to be sealingly secured to an end of one of said sections, said ball element having a passage extending therethrough between said one side and the side opposed thereto;
 (B) an annular first socket element matingly received on said one side for articulative movement relative thereto, said element having a collar extending radially outwardly therearound;
 (C) a semi-spherical second socket element matingly received on the side of said ball element opposed to said one side for articulative movement relative thereto, said element having a collar extending radially outwardly therearound in juxtaposition to the collar of said first socket element and an opening therethrough adapted to be sealingly secured in fluid communication to an end of the other of said sections;
 (D) a rigid annular strap extending around said collars;
 (E) snap rings lockingly received in said strap on opposite sides of said collars and in locking engagement with said collars to hold said collars in juxtaposed relationship, said snap rings each being interrupted to define a pair of spaced apart opposed ends;
 (F) a spacer removably inserted between the opposed ends of each of said rings to maintain said ends in spaced apart relationship and said rings in locking engagement with said collars; and wherein:
  (a) said first and second socket elements have grooves formed in the interior surfaces thereof in juxtaposition to said ball element;
  (b) said strap and said socket elements have interconnecting ducts therethrough communicating with said grooves and means constantly supplying and maintaining fluid under pressure to said grooves; and including,
   (1) seal means in said first socket element restraining the flow of fluid therepast from the grooves therein; and
   (2) wiping means in said second socket element permitting a limited amount of fluid to flow therepast from the grooves therein.

References Cited

UNITED STATES PATENTS

| 95,921 | 10/1869 | Mears | 285—397 |
| 1,076,962 | 10/1913 | Doble | 285—271 X |
| 2,286,122 | 6/1942 | Strapp | 285—271 X |
| 2,874,978 | 2/1959 | Stilwell | 285—261 X |
| 3,122,383 | 2/1964 | Hirsch | 285—97 |
| 3,306,636 | 2/1967 | Hereth | 285—266 X |

FOREIGN PATENTS

| 51,690 | 6/1952 | Belgium. |
| 166,718 | | Great Britain. |
| 691,653 | 5/1953 | Great Britain. |

CARL W. TOMLIN, *Primary Examiner.*

D. W. AROLA, *Assistant Examiner.*

U.S. Cl. X.R.

285—55, 91, 96, 175, 184, 261, 321, 364